United States Patent [19]

Strauss

[11] 3,735,288

[45] May 22, 1973

[54] PHASE MODULATOR

[75] Inventor: George M. Strauss, Elmhurst, N.Y.

[73] Assignee: The United States of America as represented by the Secretary of the Navy, Washington, D.C.

[22] Filed: Dec. 29, 1971

[21] Appl. No.: 213,664

[52] U.S. Cl. ........................332/18, 307/311, 330/9, 332/3

[51] Int. Cl. ...............................................H03c 3/08

[58] Field of Search ..........................332/3, 16, 16 T, 332/18, 19; 307/311; 330/9, 30 D, 69; 325/147, 148

[56] References Cited

UNITED STATES PATENTS

| | | | |
|---|---|---|---|
| 3,393,380 | 7/1968 | Webb | 332/19 |
| 3,462,615 | 8/1969 | Bernstein | 307/311 X |
| 3,579,150 | 5/1971 | Badessa | 332/19 |
| 3,525,942 | 8/1970 | Boronkay et al. | 307/311 X |

OTHER PUBLICATIONS

Hellwarth et al. "Push–Pull Feedback Delta Modulator" IBM Tech. Disclosure Bulletin Vol. 7, No. 7, pp. 877–878, Dec. 1968.

*Primary Examiner*—Alfred L. Brody
*Attorney*— R. S. Sciascia, Roy Miller and Robeit W. Adams

[57] ABSTRACT

A phase or frequency modulator having an operational amplifier with inverting and noninverting terminals, an RC network wherein R is light responsive, a control signal for controlling the light intensity, and a phase detector for comparing the phase of the modulated and unmodulated signal and feeding back an error signal to the light source.

5 Claims, 2 Drawing Figures

Patented May 22, 1973 3,735,288

PHASE MODULATOR

BACKGROUND OF THE INVENTION

The invention is directed to the field of modulators and represents a novel means for automatically controlling the phase or frequency of a sinusoidal modulator proportional to an input control signal, i.e., automatically modulating an input signal in response to a control signal.

Previous modulators are either mechanical devices or devices which include extensive and complicated circuitry, and do not automatically control the modulation.

SUMMARY OF THE INVENTION

The present invention is a phase modulator which may be operated as a frequency modulator, wherein the modulation is variable and selectable, and controlled electronically. The modulator preserves the amplitude of the carrier signal which is applied through a resistive means to the inverting terminal of an operational amplifier and through an RC circuit to the noninverting terminal. The resistor (R) of the RC circuit is light sensitive and controlled by an adjustable control signal. And, the system output is compared with the control signal in a high-gain feedback loop to suppress the nonlinearity of the control characteristics.

DESCRIPTION OF THE PREFERRED EMBODIMENT

Figure 1:
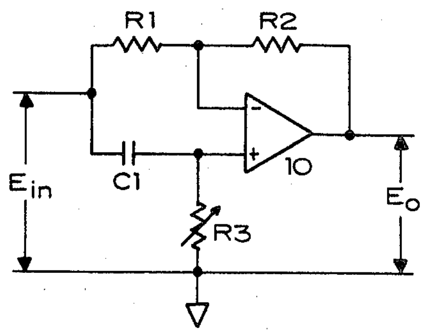
FIG. 1. ( PRIOR ART )
FIG. 1 is a schematic diagram of a conventional operational RC phase-shifter.

FIG. 1 shows a conventional operation RC phase-shifter. The gain to the signal applied at the amplifier's noninverting input (+) is +2 because input and feedback resistors $R_1$ and $R_2$, connected to the inverting input (−), are equal. Thus the two components, E+ and E−, of the output signal are $$E_+ = (2E_{in}\ R_3)/(R_1 + 1/C_1 s) = (2E_{in}R_3C_1s)/(R_3C_1s + 1)$$

Due to the noninverting input and $$E_- = -E_{in}$$

Due to the inverting input therefore $$E_o = E_+ - E_- = E_{in}[(2R_3C_1s/R_3C_1s + 1) - 1\ ] = -E_{in}[1 - R_3C_1s/1 + R_3C_1s]$$

$$= - E_{in}[1 - j\omega R_3C_1/1 + j\omega R_3C_1]$$

or, in polar notation, $$E_o = (E_{in})/(\pi - 2\tan^{-1}\omega R_3C_1)$$

It can be seen from the equations that the circuit preserves invariant amplitude, unlike a simple series-shunt RC circuit, and the range of phase shift available using a resistor variable from zero to R is twice that the series-shunt circuit would yield for the same frequency and capacitance, i.e., 0° to 180° rather than 0° to 90°.

If mechanical means are used to vary the resistance, an expensive design and nonlinearity of the relationship of phase shift to shaft angle results. And, the modulation bandwidth is limited by the performance of the mechanical components.

Figure 2:
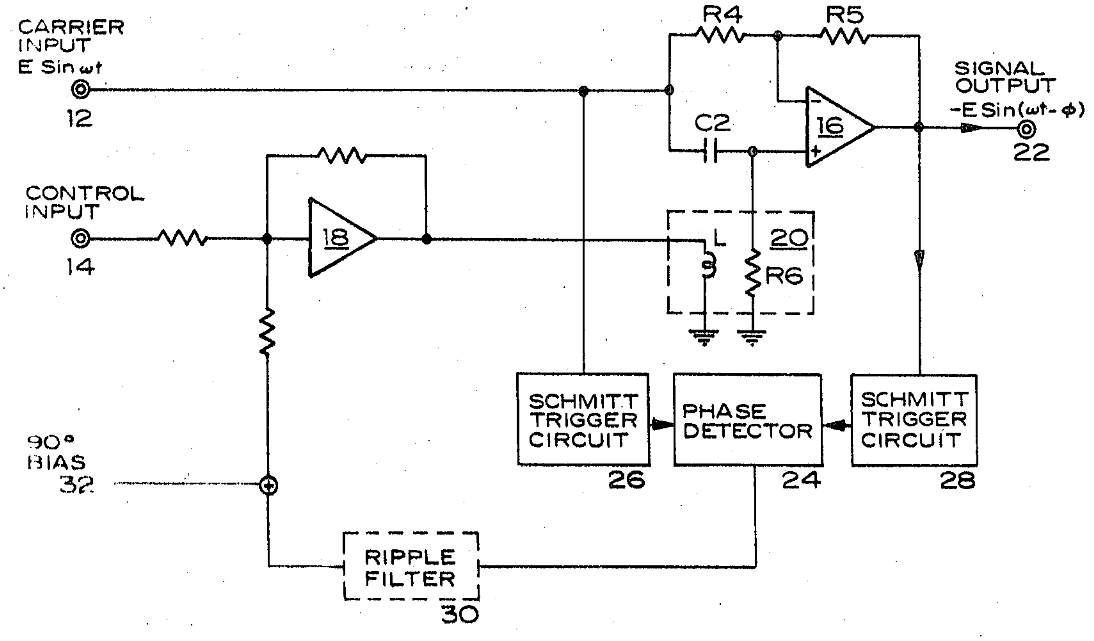
FIG. 2 is a schematic diagram, partially in block from, of the preferred embodiment of the present invention.

The present invention shown in FIG. 2 furnishes phase-modulated or, within limits, frequency modulated sinusoidal test signals wherein the bandwidth of the modulating signal can be within two or three decades of the carrier frequency and the modulation will follow the input control command faithfully.

The invention comprises operational amplifier 16 having inverting and noninverting terminals coupled through resistor $R_4$ and capacitor $C_2$, respectively, to carrier input 12. The output of operational amplifier 16 is both coupled to signal output 22 and, through resistor $R_5$, to the inverting terminal.

Modulation control input 14 is coupled through operational amplifier 18 to Raysistor 20. The unmodulated signal, i.e., the carrier signal is coupled through Schmitt trigger 26, and the modulated signal is coupled through Schmitt trigger 28, to phase detector 24. The output of phase detector 24 is coupled through ripple filter 30, if included, to the input of operational amplifier 18 where it is compared with the control signal.

Raysistor 20 is manufactured by Raytheon and contains a light source L which is controlled by the external command signal coupled to input 14 and resistance element $R_6$, with a high degree of electrical isolation between the two.

The present invention operates as follows: A carrier signal, or other input signal, is coupled to input 12. And, a control signal is coupled to input 14. The input control voltage at input 14, which is an appropriately scaled potential proportional to the desired phase shift, is compared with the processed voltage from phase detector 24 which represents the phase actually obtained, or modulation effected. The resultant error voltage is used to drive the Raysistor in the direction which will null the error.

To obtain the processed voltage representing the phase actually obtained, the input to, and output from, the phase shifter are converted to square waves by Schmitt triggers 26 and 28. The conversion is necessary because the output of a phase detector such as phase detector 24 with sinusoidal inputs is proportional to the sin $(90° - \Phi)$ rather than the angle itself. By using high-value, accurately controlled input voltages, however, a high degree of phase accuracy can be maintained. Even though Raysistor 20 will tend to filter the signal it receives, the measured phase output (the output of phase detector 24) may be separately filtered by ripple filter 30 in order to strip carrier components from the feedback signal.

Unless an appropriate bias, such as 90° bias 32 is introduced the modulator will produce a 90° phase shift for zero volt input since the phase detectors input-output characteristic crosses zero voltage when the two input waveforms are in quadrature. Although 90° bias 32 is shown as added to the output of phase detector 24 it may equally well be added to input 14. With the addition of a 90° bias a command input of zero volts will place the phase of the output at 0°, which is the beginning of the range.

The advantages of the present invention are that the input-output phase relationship obtained will follow the command signal voltage faithfully within its range of accuracy, irrespective of carrier frequency.

The device may be used as a frequency modulator by placing an operational integrator in cascade with the controlled input between the control signal source and control input 14, such that the input represents the time integral of the frequency command, i.e., a phase command. Care must be given to limit the phase command to the range of zero to $\pi$ radians lest the phase shifter be driven to saturation. This means that the time integral of desired frequency offset may not exceed some given value. In the case of fixed frequency steps, the greater the desired step, the shorter the time for which it may be maintained.

I claim:

1. A modulator for modulating an input signal in response to a control signal, comprising:

an input signal input;

a control signal input;

a first circuit having a first operational amplifier, a first resistive means coupling the input signal input to the inverting terminal of the first operational amplifier, a capacitive means coupling the input signal input to the noninverting terminal of the first operational amplifier, and a second resistive means coupling the output of the first operational amplifier to said inverting terminal;

a third resistive means responsive to illumination coupled to said noninverting terminal; and a second circuit including a second operational amplifier coupled to said control signal input and an illumination means coupled to the output of the second operational amplifier;

such that the resistive value of said third resistive means is responsive to the control signal, and said modulation is related to the resistive value of said third resistive means.

2. The modulator of claim 1 wherein said second circuit further includes a phase detecting means coupled to said input signal input and the output of said first operational amplifier for comparing the phase of the signal coupled to said input signal input with the phase of the output signal of said first operational amplifier, and providing a signal in response to said comparison to said second operational amplifier.

3. The modulator of claim 2 wherein said modulator is a frequency modulator and said second circuit further includes an operational integrator having the integrator output coupled to said control signal input and the integrator input coupled to said control signal.

4. The modulator of claim 2 wherein said phase detecting means includes;

a first Schmitt trigger circuit coupled to said input signal input, a second Schmitt trigger circuit coupled to said first operational amplifier output, and a phase detector coupled to the outputs of said first and second Schmitt trigger circuits, wherein the output of said phase detector is coupled to the input of said second operational amplifier.

5. The modulator of claim 4 wherein said modulator further comprises;

a ripple filter coupled to the output of said phase detector, and a bias signal input coupled to the output of said ripple filter for combining a preselected phase value with the filtered output of said phase detector.

* * * * *